United States Patent
Hopkins et al.

(10) Patent No.: US 11,880,486 B2
(45) Date of Patent: Jan. 23, 2024

(54) DEVICE, REQUESTING A DEVICE, METHOD AND COMPUTER PROGRAM

(71) Applicant: SONY CORPORATION, Tokyo (JP)

(72) Inventors: Huw Hopkins, Basingstoke (GB); Nigel Stuart Moore, Berkshire (GB)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/981,631

(22) PCT Filed: Mar. 21, 2019

(86) PCT No.: PCT/GB2019/050799
§ 371 (c)(1),
(2) Date: Sep. 16, 2020

(87) PCT Pub. No.: WO2019/186119
PCT Pub. Date: Oct. 3, 2019

(65) Prior Publication Data
US 2021/0034781 A1  Feb. 4, 2021

(30) Foreign Application Priority Data
Mar. 28, 2018  (GB) ..................... 1805047

(51) Int. Cl.
*G06F 21/62* (2013.01)
*H04L 9/08* (2006.01)
(Continued)

(52) U.S. Cl.
CPC ...... *G06F 21/6245* (2013.01); *G06F 21/6209* (2013.01); *H04L 9/0819* (2013.01);
(Continued)

(58) Field of Classification Search
CPC ............. G06F 21/6245; G06F 21/6209; G06F 2221/2141; H04L 9/0819; H04L 9/0894; H04L 9/3236; H04L 2209/38
See application file for complete search history.

(56) References Cited

U.S. PATENT DOCUMENTS 10,361,870 B2 * 7/2019 Chow .................. G06Q 20/382
10,505,741 B1 * 12/2019 Conley .................. H04L 9/083
(Continued)

FOREIGN PATENT DOCUMENTS

| CN | 106991334 A | 7/2017 |
| JP | 2013207590 A | 10/2013 |

(Continued)

OTHER PUBLICATIONS

International Search Report dated May 17, 2019 in PCT/GBZ019/050799 filed on Mar. 21, 2019.

*Primary Examiner* — Mahfuzur Rahman
*Assistant Examiner* — Alex D Carrasquillo
(74) *Attorney, Agent, or Firm* — Oblon, McClelland, Maier & Neustadt, L.L.P.

(57) ABSTRACT

A device for authenticating an organisation requesting access to user data, comprising: network interface circuitry configured to communicate over a network, and processing circuitry configured to: receive, via the network interface circuitry, encrypted user data from an information processing apparatus; generate a unique identifier to associate with a decryption key used for decrypting the encrypted user data; provide the encrypted user data and the unique identifier to a publically available database for storage immutably therein or thereon; store the decryption key in association with the unique identifier; receive, via the network interface circuitry, a request to access the user data from an organisation; establish that the requesting organisation is an approved organisation; and in the event that the requesting (Continued)

organisation is an approved organisation; transmit, via the network interface circuitry, the decryption key to the requesting organisation.

20 Claims, 11 Drawing Sheets

(51) Int. Cl.
*H04L 9/32* (2006.01)
*H04L 9/00* (2022.01)

(52) U.S. Cl.
CPC .......... *H04L 9/0894* (2013.01); *H04L 9/3236* (2013.01); *G06F 2221/2141* (2013.01); *H04L 9/50* (2022.05)

(56) References Cited

U.S. PATENT DOCUMENTS

| | | | |
|---|---|---|---|
| 2003/0101341 A1* | 5/2003 | Kettler, III | G06F 21/6245 713/162 |
| 2003/0172298 A1* | 9/2003 | Gunter | H04L 63/12 713/156 |
| 2008/0046758 A1* | 2/2008 | Cha | H04L 9/3247 713/189 |
| 2008/0066184 A1 | 3/2008 | Ben-Ami et al. | |
| 2011/0126012 A1* | 5/2011 | Ben-Ami | H04L 63/062 713/168 |
| 2014/0013398 A1* | 1/2014 | Hotti | G06F 21/6218 726/4 |
| 2015/0310188 A1* | 10/2015 | Ford | H04L 63/0428 726/28 |
| 2015/0332283 A1 | 11/2015 | Witchey | |
| 2017/0295023 A1* | 10/2017 | Madhavan | G06F 21/40 |
| 2018/0046766 A1 | 2/2018 | Deonarine et al. | |
| 2018/0060496 A1* | 3/2018 | Bulleit | H04L 9/0643 |
| 2018/0225194 A1* | 8/2018 | Saleh-Esa | G06F 11/3664 |
| 2018/0268386 A1* | 9/2018 | Wack | G06F 21/602 |
| 2018/0343114 A1* | 11/2018 | Ben-Ari | H04L 9/06 |
| 2019/0228132 A1* | 7/2019 | Gabriel | H04L 9/0894 |
| 2019/0236312 A1* | 8/2019 | Peuhkurinen | G06F 21/6281 |
| 2020/0082361 A1* | 3/2020 | Chan | H04L 9/3247 |
| 2021/0056081 A1* | 2/2021 | Nation | H04L 9/0643 |
| 2021/0098096 A1* | 4/2021 | Gergely | G06F 16/9554 |
| 2021/0264052 A1* | 8/2021 | Magerkurth | G06Q 20/4014 |

FOREIGN PATENT DOCUMENTS

| | | |
|---|---|---|
| JP | 2017207979 A | 11/2017 |
| WO | WO 2017/090041 A1 | 6/2017 |

* cited by examiner

```
data_ID    : fac0d6fb-8aec-42a8-b43d-ccf588121969 org_ID     : com.organisation_Org-O drm_data   : <DRM data> signature  : signature of {data_id, org_id and drm _data}
```

Data Structure

FIG. 5

| | |
|---|---|
| data_ID | : fac0d6fb-8aec-42a8-b43d-ccf588121969 |
| transaction_ID | : d8c56f47-33b6-4afc-bc7c-55849d364489 |
| Granting_org_ID | : com.organisation_OrgJ |
| Receiving_org_ID | : com.organisation_OrgK |
| Statement | : "Org_J is granting permission to Org_K to access data identified by data_ID, and Org_K is accepting permission from Org_J" |
| Signature_1 | : Signature of {data_ID, transaction_ID, Granting_org_ID, Receiving_org_ID, statement} signed by Org_J |
| Signature_2 | : Signature of {data_ID, transaction_ID, Granting_org_ID, Receiving_org_ID, statement} signed by Org_K |

Node stored in Block Chain showing Permission

FIG. 8

| data_ID 1110A | key 1120A |
|---|---|
| data_ID1 | key_1 |
| data_ID2 | key_2 |
| data_ID3 | key_3 |
| ⋮ | ⋮ |
| data_IDN | key_N |

1100A

| Organisation 1110B | Authorised 1120B | Signature 1130B |
|---|---|---|
| org_A | ✓ | org_A.sig |
| org_B | ✗ | org_B.sig |
| org_C | ✓ | org_C.sig |
| ⋮ | ⋮ | ⋮ |
| org_N | ✓ | org_N.sig |

DEVICE, REQUESTING A DEVICE, METHOD AND COMPUTER PROGRAM

BACKGROUND

Field of the Disclosure

The present disclosure generally relates to a device, requesting device, method and computer program.

Description of the Related Art

The "background" description provided herein is for the purpose of generally presenting the context of the disclosure. Work of the presently named inventors, to the extent it is described in the background section, as well as aspects of the description which may not otherwise qualify as prior art at the time of filing, are neither expressly or impliedly admitted as prior art against the present disclosure.

The personal data of a customer is very sensitive. However, on many occasions, in order to provide a customer with services that are relevant to that customer, the personal data needs to be shared. For example, the customer may want television show suggestions to be provided by suppliers of video content. However, it is inconvenient for a user to repeatedly provide their personal data to various websites and suppliers. Accordingly, it is desirable for the customer to provide their personal data to one organisation and for that organisation to share the personal data with other, relevant, organisations. Sometimes the organisation with whom the personal data is shared will share the personal data with a third organisation, who then may share the personal data again and so on.

With so many organisations being provided with the personal data, the security of the personal information may be compromised. For example, the personal data may be ultimately shared with an organisation whose security procedures are not satisfactory for the customer.

Moreover, if there is a leak of the customer's personal data or if the organisation holding the personal data is hacked, then there is very little traceability of the path the personal data travelled to mitigate the chance of a leak happening again or to catch the culprit of the leak.

It is an aim of the present disclosure to address at least one of these issues.

SUMMARY

According to embodiments of the disclosure, there is provided a device for authenticating an organisation requesting access to user data, comprising: network interface circuitry configured to communicate over a network, and processing circuitry configured to: receive, via the network interface circuitry, encrypted user data from an information processing apparatus; generate a unique identifier to associate with a decryption key used for decrypting the encrypted user data; provide the encrypted user data and the unique identifier to a publically available database for storage immutably therein or thereon; store the decryption key in association with the unique identifier; receive, via the network interface circuitry, a request to access the user data from an organisation; establish that the requesting organisation is an approved organisation; and in the event that the requesting organisation is an approved organisation; transmit, via the network interface circuitry, the decryption key to the requesting organisation.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 5 shows a data structure according to embodiments to be placed on the publically available database;

FIG. 8 shows a data structure giving permission to an organisation from another organisation to access the user data;

FIG. 11 shows two databases stored within the server storage.

DESCRIPTION OF THE EMBODIMENTS

Figure 1:
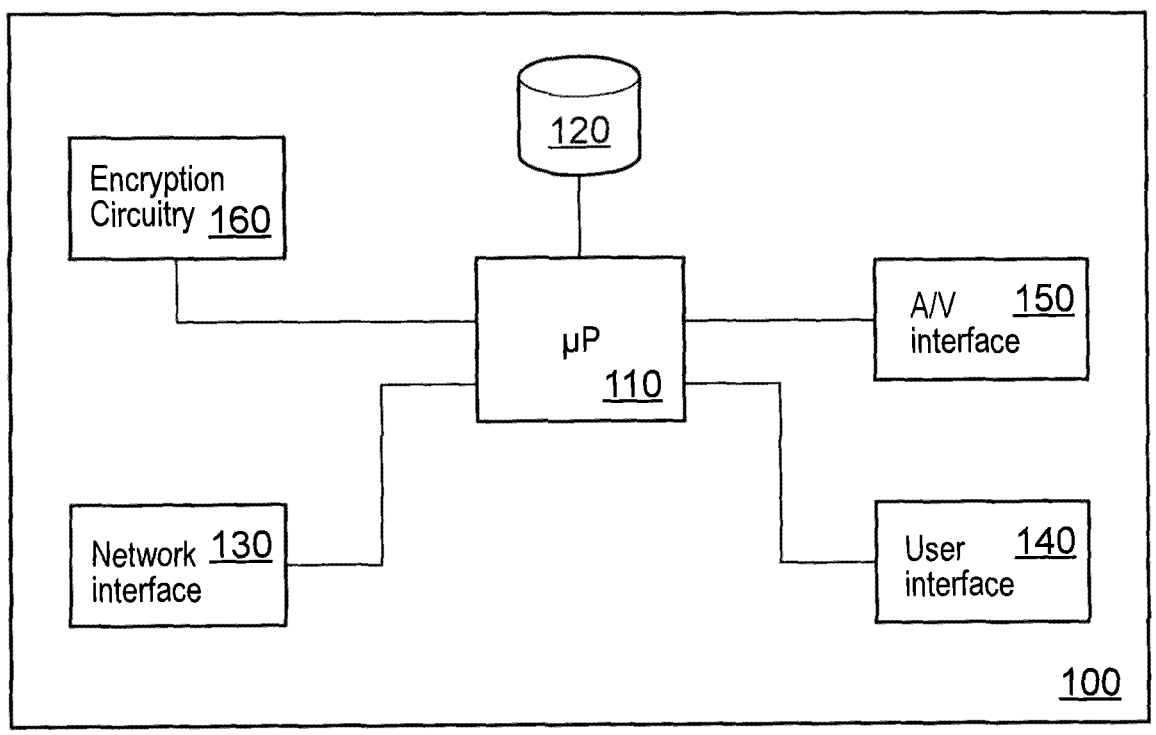
FIG. 1 shows an information processing apparatus according to embodiments of the disclosure.

Referring now to the drawings, wherein like reference numerals designate identical or corresponding parts throughout the several views.

FIG. 1 shows an information processing apparatus according to embodiments of the disclosure. The information processing apparatus 100 may be any kind of device into which a user may input information pertaining to the user (so-called "user data"). For example, the information processing apparatus 100 may be a television, cable or satellite set-top box, mobile telephone, games console, tablet computer or the like. The user data may include, but are in no way limited to, program preferences (such as types of programs the user likes to view), audio and/or video settings on the television, health or financial information, payment preferences such as credit card information, location information such as a GPS location of the information processing apparatus 100 or a television region or the like. In embodiments, user data may be explicitly input by a user (for example by typing on a keyboard, interacting with a Graphical User Interface or by voice recognition) or may be implied or derived from other actions or systems (for example implying from watched or selected content that a user enjoys action films or follows a particular football team or subscribes to a particular internet service or level of service or is actively influenced by advertisements or is located in a particular location by virtue of the accessibility of a particular signal such as a wifi or broadcast signal).

In embodiments, the user data may include one or more categories of data. For example, one category of data may be user settings and another set of data may be bank information. The categories may be defined in accordance with the security associated with the data. For example, any data having a high security level may be a first category and any data having a low security level may be a second category.

Where more than one category of data is present, it is envisaged that each category is split onto different nodes because it is possible for one organisation to be provided access to one node rather than another node. This will enable a requesting organisation to be provided access to a single node depending upon its security level. For example, where an organisation is permitted to access user settings but not bank information, the organisation is permitted to access the appropriate node. Of course, the disclosure is not so limited. The access to the user data may be determined based upon the security level associated with the category of user data. For example, the user data may be split onto different block chain branches depending upon the category of the user data and the security level associated with the Organisation. This split may be performed on request depending upon the level of security approval associated with the organisation.

In other embodiments, usage rules are used to direct the organisation to access user data having a security level appropriate for the user data. For example, the rules will define whether the organisation can access bank information or the like.

The user will enter the user data by interacting with a user interface 140. The user interface 140 may be a touch-screen, a mouse, keyboard, voice recognition system or the like. The user interface 140 is connected to a processor 110. The processor 110 is circuitry configured to control the information processing apparatus 100. The processor 110 will operate according to computer readable code which instructs the processor 110 to perform various functions. The computer readable code may be software. The software is stored in information processing apparatus storage 120 which may be solid-state or magnetic or optically readable data storage. The information processing apparatus storage 120 may also contain other user specific information such as profile information defining a user name and password associated with a particular user.

Additionally connected to the processor 110 is an audio/video (A/V) interface 150. The A/V interface 150 allows the information processing apparatus 100 to provide or receive audio and/or video data with an external device or to provide audio and/or video data to a display or other apparatus.

Further connected to the processor 110 is a network interface 130. The network interface 130 connects to a network and allows data to be provided over the network. The network interface 130 may communicate with one or more devices over the network using any appropriate mechanism. For example, the network interface 130 may communicate over a cellular network, or a wired network. The network interface 130 may communicate over a Local Area Network (LAN), a Wide Area Network (WAN), the Internet or over a cellular connection such as 3G, 4G, LTE or the like. Indeed, the network interface 130 may select the appropriate type of connection with the network such as a secure connection for sensitive data or an unsecure connection where the privacy of the data is not important.

Finally, encryption circuitry 160 is connected to the processor 110. The purpose of the encryption circuitry 160 is to encrypt user data which is then sent over the network. It is envisaged that the data will be encrypted using a known encryption technique where the data is encrypted using an encryption key. As will be explained later, the data key (hereinafter referred to as data_key) is the key that decrypts the encrypted user data. Although the encryption circuitry 160 is shown included in the information processing apparatus 100, the disclosure is not so limited. Indeed, the encryption circuitry 160 may be located in a different device to which the user data is sent. In this instance, the encryption circuitry 160 will perform the same function of encrypting the user data using the data_key.

Figure 2:
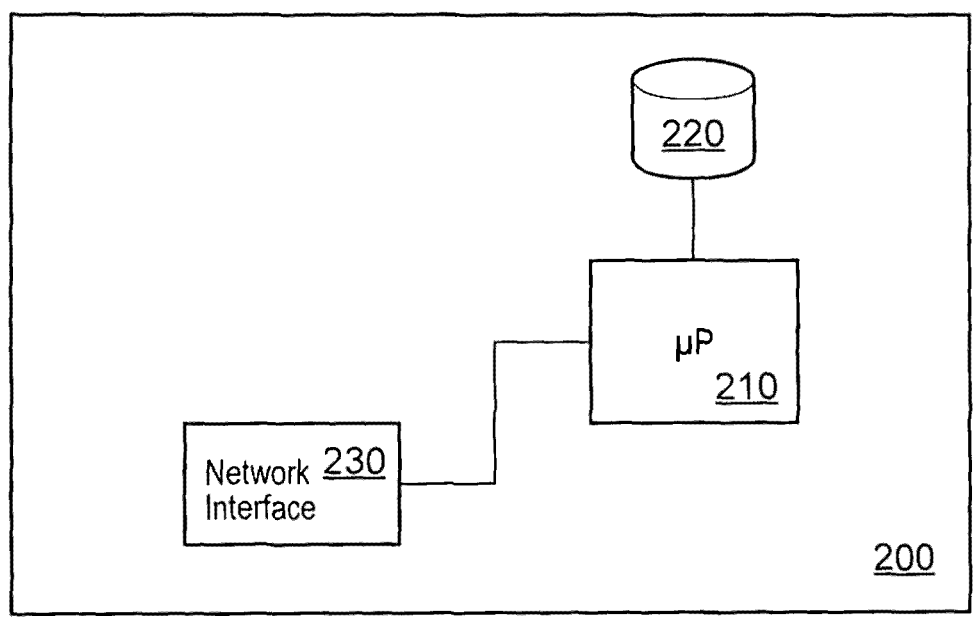
FIG. 2 shows a server according to embodiments of the disclosure.

FIG. 2 shows a server 200 according to embodiments of the disclosure. It is envisaged that the server 200 communicates with the information processing apparatus 100 over a network using a server network interface 230. It should be noted that the server 200 may be any kind of device such as a computer, or computing device.

The server 200 is controlled by a server processor 210. The server processor 210 is circuitry configured to control the server 200. The server processor 210 will operate according to computer readable code which instructs the server processor 210 to perform various functions. The computer readable code may be software. The software is stored in server storage 220 which may be solid-state or magnetic or optically readable data storage. The server storage 220 contains one or more database (or other data structure or arrangement) as will be explained with reference to FIG. 11.

Further connected to the server processor 210 is a server network interface 230. The server network interface 230 connects to a network and allows data to be provided over the network. The server network interface 230 may communicate with one or more apparatuses over the network using any appropriate mechanism. For example, the server network interface 230 may communicate over a cellular network or other wireless network, or a wired network. The server network interface 230 may communicate over a Local Area Network (LAN), a Wide Area Network (WAN), the Internet or over a cellular connection such as 3G, 4G, LTE or the like. Indeed, the server network interface 230 may select the appropriate type of connection with the network such as a secure connection for sensitive data or an unsecure connection where the privacy of the data is not important.

The server 200 may communicate with a block chain. The block chain is one example of a publically available database upon which data is stored in an immutable manner. In other words, in embodiments of the disclosure, the server 200 provides data to a publically available database in an immutable manner. This publically available database may be provided anywhere, for example in the cloud, on an edge server, on the Internet, within the server storage 220 or on the block chain.

Figure 3:
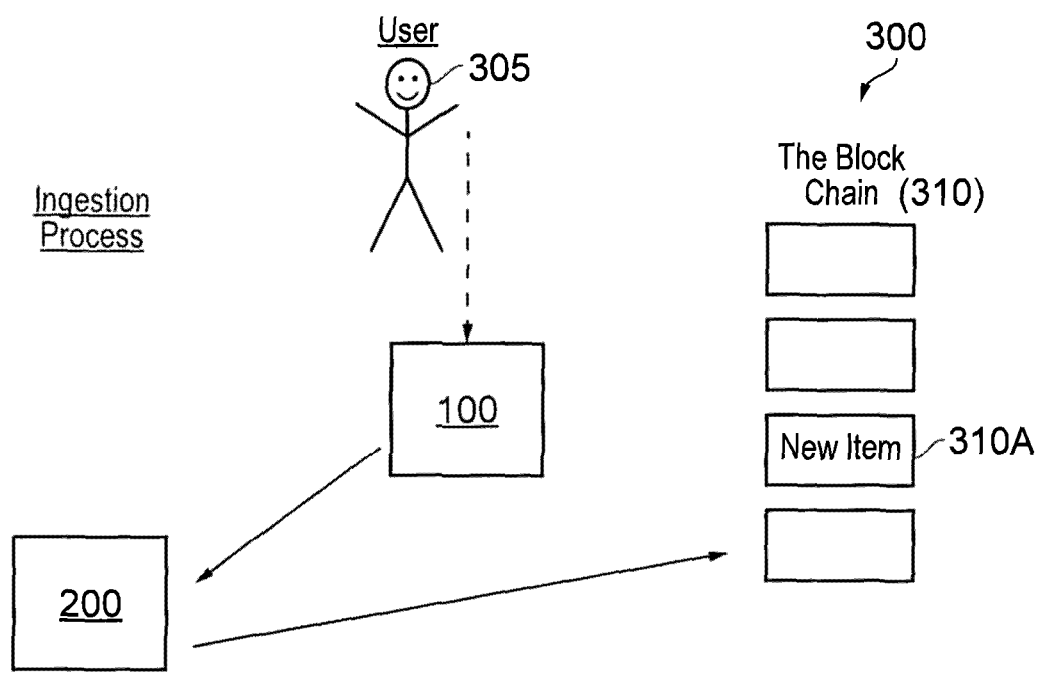
FIG. 3 shows a schematic diagram describing the ingestion process according to embodiments of the disclosure.

Referring to FIG. 3, a schematic diagram showing the ingestion process according to embodiments of the disclosure is shown. A user 305 provides user data to the information processing apparatus 100 according to embodiments. In the specific example, the user provides the user data to the user interface 140.

The user data may be provided by the user directly interacting with the information processing apparatus 100 or may be provided by a different device with which the information processing apparatus 100 communicates. This may include a device located on a network or may include a wearable device which provides biometric information about the user or other information from sensors such as GPS information or the like.

The provision of the user data to the information processing apparatus 100 is signified by the dotted line in FIG. 3.

In addition to the user data, the user 305 may also provide usage rules which are to be respected. These are optional. For example, the usage rules may define which organisations may access the data or a time limit on when the user data may be accessed or to which organisations some or all of the user data may be passed. For example, the usage rules may include rules such as never provide access to the data after 1 Jan. 2035 or only provide the user data to companies that comply with ISO27001, or never share with "Company C" or the like. These usage rules may also be stored on the publically available database. These usage rules may be secured using the encryption key (data_key) or may be stored in an unencrypted form.

The information processing apparatus 100 communicates with the server 200 of FIG. 2. More specifically, the network interface 130 of the information processing apparatus 100 communicates with the server network interface 230 of the server 200. This communication may occur over any kind of network or datalink and may be a connection over the Internet, a cellular network or a point-to-point or peer-to-peer link or the like.

In embodiments, the server 200 is operated by a Digital Rights Management (DRM) provider. Of course, the entity operating the server 200 is arbitrary.

As will be explained later, the purpose of the server 200 is to be a repository of information that allows the third parties to access the user data whilst maintaining the security of the user data. Specifically, the repository of information is stored on the server storage 220. This will be explained later.

After the server 200 has received the relevant information from the information processing apparatus 100, the information processing apparatus 100 creates a data structure according to embodiments which is placed on a node of a block chain 310. In FIG. 3, the data structure is added as a new item on a node 310A within the block chain.

Of course, although the following will describe placing the data structure onto a block chain, the disclosure is no way limited to this. This was noted above. Indeed the data structure may be placed on any database which in a non-limiting way allows anyone to review. The data structure can be one which can be manipulated to form a database, for example by having structural tags which define fields, or by always arranging that specific fields are in certain positions or orders, optionally with respect to delimiting characters. It should be noted here, though, that according to embodiments the data structure within the database should be immutable. In other words, the data structure, once written to the block chain (or other database) should not be able to be changed.

Figure 4:
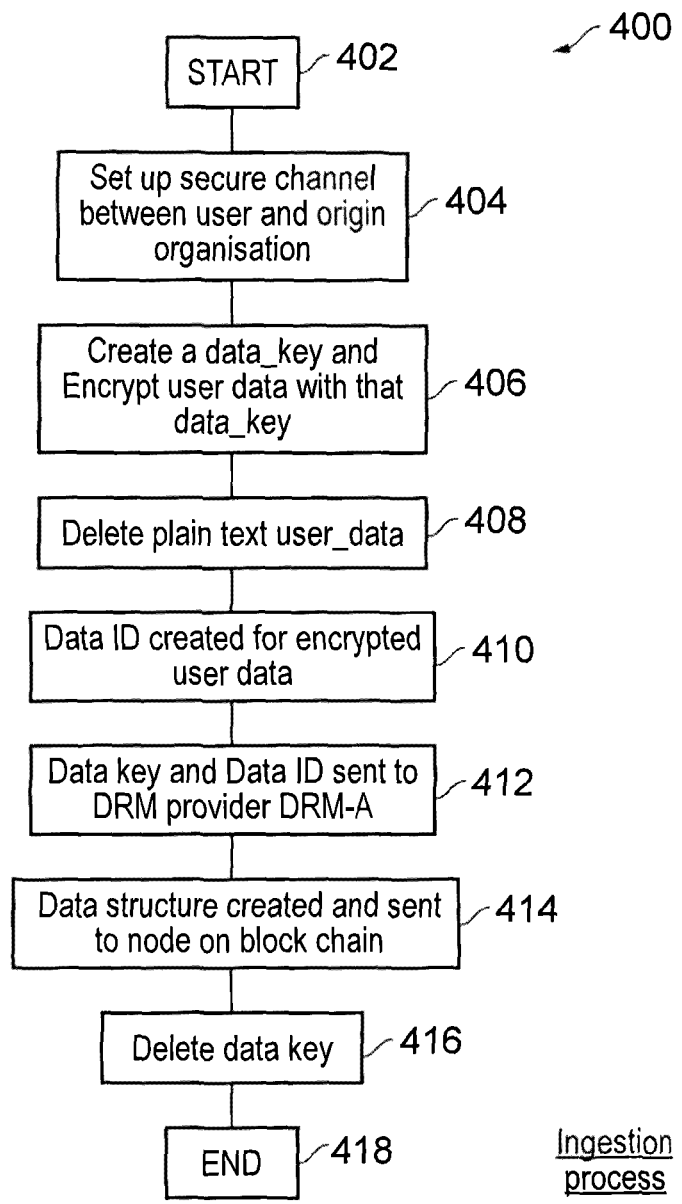
FIG. 4 shows a process describing the ingestion process of the user data as the data structure onto the publically available database.

Referring to FIG. 4, a process 400 explaining the ingestion process of the user data as the data structure onto the block chain is described.

The process 400 starts at step 402. In this case, the user may enter the user data into the information processing apparatus 100.

The process moves to step 404 where a secure channel is set up between the user and the processor 110. In embodiments, the secure channel will be established between the user interface 140 and the processor 110. This may be a Transport Layer Security (TLS) channel or the like.

In the description of FIG. 4, the information processing apparatus 100 is called an origin organisation. This is because it is envisaged that the information processing apparatus 100 may run software code such as an application that establishes the identity and connection parameters to contact the server 200. Of course, the disclosure is not so limited. In other instances, the origin organisation may be a different organisation with which the information processing apparatus 100 communicates. In this case, the information processing apparatus 100 will establish the secure connection with the external origin organisation.

After the secure channel has been established, the user data is encrypted using the encryption circuitry 160. Specifically, the user data is encrypted with a data key by the encryption circuitry 160. This is step 406.

The process then moves to step 408 where the user data is deleted by the information processing apparatus 100. In this case, although not limiting, it is envisaged that the user data is securely deleted such that if the information processing apparatus 100 were compromised by a malicious hacker accessing the apparatus 100 or the apparatus 100 were lost or stolen, then the user data could not be retrieved.

The process then moves to step 410 where a Data Identity (Data-ID) is created by the information processing apparatus 100 (or the origin organisation) for the encrypted user data. The Data-ID is unique to the encrypted user data and may be, for example, 128 bits long. This Data-ID may be universally unique (i.e. unique across the world) or may be unique to a specific region such as a country or continent or the like. Although the information processing apparatus 100 could generate a unique Data-ID using any mechanism (such as a 4-UUID at https://www.uuidgenerator.net), one possible other mechanism may include using a Unique Time Reference (UTR) at which the user data is generated in conjunction with the Media Access Control address (MAC address) of the information processing apparatus 100. As the MAC address is unique and the time at which the user data is generated is unique to the information processing apparatus 100, this mechanism would create a unique Data-ID.

The process then moves to step 412 where the data key used to encrypt the user data, the unique Data-ID and any usage rules are sent to the server 200 for storage in the server storage 220. The data key and the unique Data-ID are stored in association with each other. In other words, by knowing the unique Data-ID the data key can be established. Additionally, the usage rules are stored in association with the Data-ID.

The information processing apparatus 100, having received confirmation from the server 200 that the data key and the unique Data-ID have been successfully stored, creates the data structure that is placed on the block chain. This will be described with reference to FIG. 5.

The information processing apparatus 100 then securely deletes the data key so in the event that the information processing apparatus 100 is lost or stolen, the data key cannot be retrieved. This is step 416.

The process then ends in step 418.

Referring to FIG. 5, an example data structure according to embodiments to be placed on the block chain is shown.

The data structure according to embodiments has 4 fields.

Data_ID—This is the unique Data-ID given to the encrypted user data. In the example of FIG. 5, the Data_ID is the 4-UUID unique identifier fac0d6fb-8aec-42a8-b43d-ccf588121969.

Org_ID—This is a unique identifier associated with the origin organisation. In the event that the origin organisation is the information processing apparatus 100, the Org_ID may be the MAC address of the apparatus 100. In the case of Figure, the Org_ID is com.organisation_Org-O.

DRM_Data—The DRM_Data is the encrypted user data (encrypted using the data key).

Signature—This is the signature of the Origin Organisation which signs the Data_ID, the Org_ID and the DRM_Data fields.

The information processing apparatus 100 places the data structure on the block chain using the network interface 130.

Figure 6:
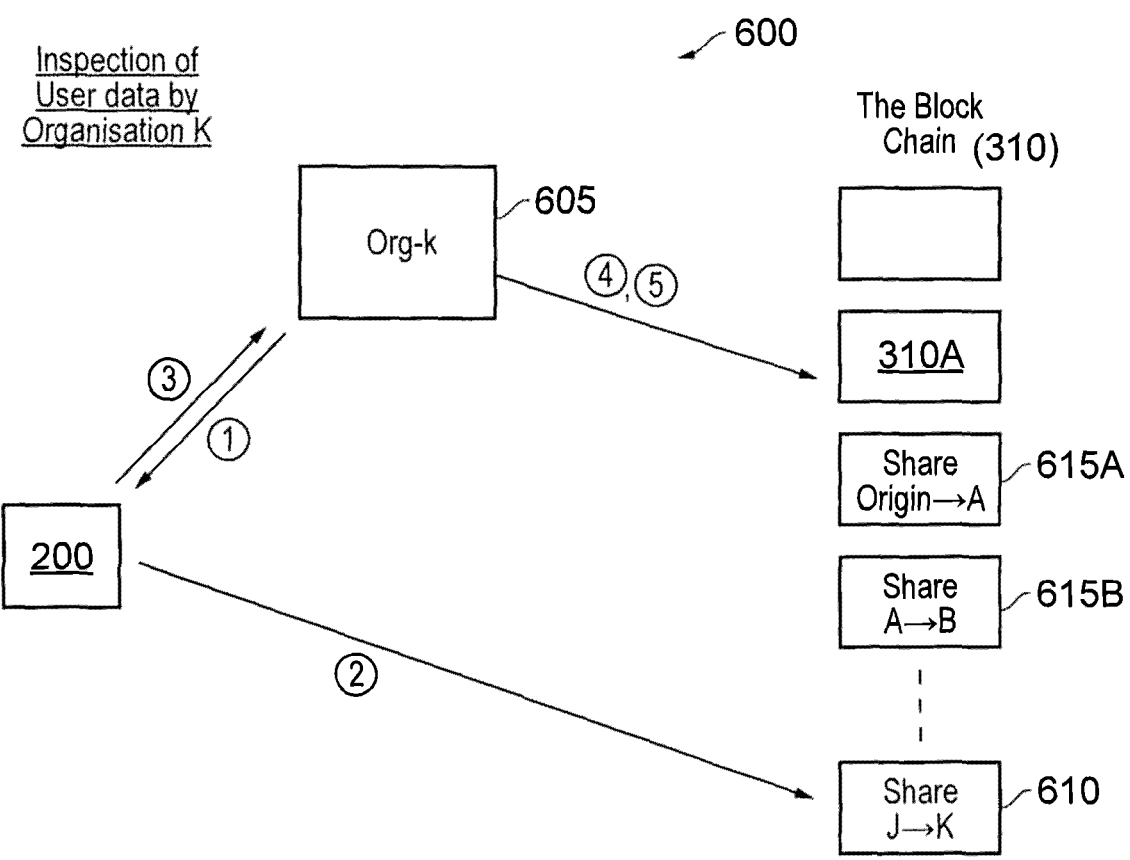
FIG. 6 shows a schematic diagram describing the mechanism for accessing the user data.

Referring to FIG. 6, a schematic diagram 600 showing the mechanism for inspecting (or accessing) the user data is shown. For ease of explanation, no specific usage rules have been provided by the user.

As explained above, in many instances a second company that needs to access the information may ask the first company to allow it to access the user data. This may be because the second company may provide a service to the first company (such as an outsource provider) and so will require access to the user data.

In the example of FIG. 6, the block chain 310 shows the original data structure 310A that was uploaded onto the block chain using the process shown in FIG. 4. In addition, each successive node of the block chain is updated with details of each organisation that has requested access to the user data. The node of the block chain also identifies which organisation gave permission to access the data. This is depicted in FIG. 6 with node 615A (which is subsequent to the data structure node 310A) showing the origin organisation gave permission to organisation A to access the user data. The next node 615B shows that organisation A gave permission to organisation B to access the user data.

This node structure continues until the final node 610 shows that organisation J gave permission to organisation K 605 to access the user data.

In FIG. 6, there are broadly speaking five steps. These steps will be explained in more detail with reference to FIG. 7 later.

The first step in FIG. 6 is for Organisation_K (Org_K) 605 to request a licence to access the user data associated with Data_ID. In order to obtain this licence, Org_K sends a request to server 200. This request will include Data_ID and the Org_ID for organisation K. The Data_ID is required to establish which user data is requested and the Org_ID is required to confirm that Organisation K is authorised to access the user data. For example, Org_K must comply with certain data security requirements such that all user data which is accesses is securely deleted, its network is sufficiently robust to avoid being hacked and so on.

The second step in FIG. 6 is for the server 200 to validate the block chain starting from Org_K back to the Origin Organisation. In other words, the integrity of the chain of permission sharing allowing access to other organisations is checked. This will be described with reference to FIG. 7.

After the block chain has been validated, the third step is for the server 200 to provide the data key and any usage rules to Org_K.

Org_K then retrieves the DRM_Data from the block chain and decrypt the DRM_Data using the data key provided by the server 200. This is step four. Finally, in the fifth step, after successfully decrypting the DRM_Data to reveal the user data, after the User Data has been accessed, and in compliance with any usage rules, Org_K securely deletes the user data.

Figure 7:
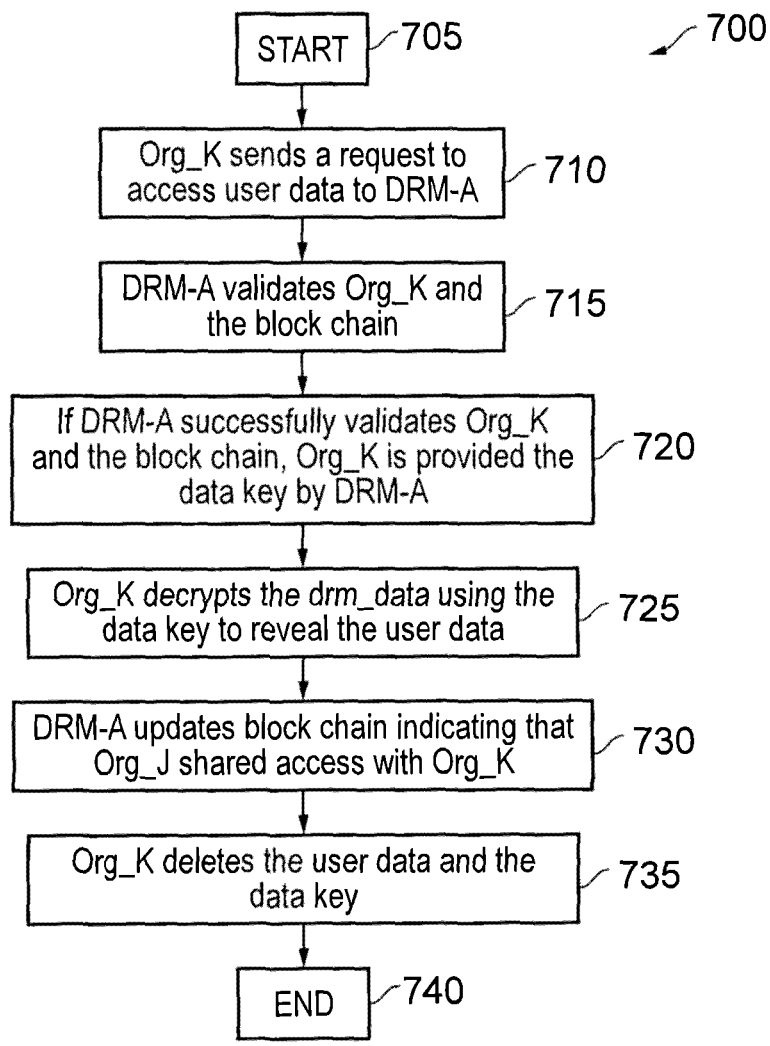
FIG. 7 shows a flow chart describing accessing of the user data.

Referring to FIG. 7, a flow chart showing the inspection of private data process 700 is given. The process starts at step 705. The process moves to step 710 where Org_K sends a request to access the user data to server 200. As noted above in FIG. 6, when Org_K sends a request to access the user data, the request includes the Data_ID and Org_ID for Org_K. As the Org_ID is to authenticate the identity of Org_K, provision of Org_ID is optional.

The process moves to step 715, where server 200 validates the identity of Org_K. This may be achieved by comparing the Org_ID of Org_K with a known, authenticated identity for Org_K. In the event of a positive comparison, the identity of Org_K is validated. Of course, other mechanisms for validating the identity of Org_K are envisaged.

Further, in step 715, the block chain and specifically the chain of access licenses is validated by server 200. This is explained with reference to FIGS. 9 and 10.

The process then moves to step 720. In step 720, assuming that the validity of Org_K and the chain of access licenses is validated, server device 200 sends the data key that is associated with the requested Data_ID to Org_K. In addition, any usage rules also associated with the Data_ID are sent to Org_K.

The process moves to step 725. In step 725, assuming the usage rules permit it, Org_K decrypts the DRM_Data retrieved from the block chain using the data key provided by server device 200. This reveals the user data to Org_K.

The process moves to step 730 where server 200 updates the block chain to indicate that Org_J shared access with Org_K. This update will be described with reference to FIG. 8.

The process then moves to step 735 where Org_K deletes the user data and the data key. The process ends in step 740.

Referring to FIG. 8, a data structure giving permission to Org_K to access the user data. The data structure of FIG. 8 is stored in node 610 within the block chain. In embodiments, Org_J may co-ordinate and assemble the data structure. Org_J would then place the data structure on the block chain. Of course, the disclosure is not so limited and any organisation may place the data structure on the block chain. It is envisaged that in non-limiting embodiments, the same organisation would assemble the data structure and upload this to the block chain.

The data structure of FIG. 8 includes:

Data_ID: This is the unique Data-ID given to the encrypted user data. In the example of FIG. 8, the Data_ID is the 4-UUID unique identifier fac0d6fb-8aec-42a8-b43d-ccf588121969

Transaction_ID: This is an identifier that uniquely identifies the transaction. In other words, the Transaction_ID is an identifier that uniquely identifies the permission given by Org_J to Org_K. This may be a 4-UUID unique identifier. The Transaction_ID may be generated by either Organisation_J or Organisation_K and shared with the other organisation. The Transaction_ID will then be shared with server 200 for storage. Of course, the Transaction_ID may be generated in any appropriate manner.

Granting_Ord_ID: This is a unique identifier associated with the organisation granting permission to access the user data. In the case of FIG. 8, the Granting_Org_ID is com.organisation_Org-J Receiving_Org_ID: This is a unique identifier associated with the organisation receiving permission to access the user data. In the case of FIG. 8, the Receiving_Org_ID is com.organisation_Org-K.

Statement: This is a statement defining the permission that is being given and any restrictions attributed to the permission. Both Organisation J and Organisation K agree to the text provided in the statement. In the case of FIG. 8, the statement is "Org J is granting permission to Org_K to access data identified by data_ID, and Org_K is accepting permission from Org J".

Signature_1: This is the electronic signature uniquely associated with Org_J and must be capable of identifying if the other parts of the data structure have been tampered with after the data structure has been signed. So, Signature_1 is the signature of {Data_ID, transaction_ID, Granting_Org_ID, Receiving_Org_ID, Statement} signed by Organisation_J Signature_2: This is the electronic signature uniquely associated with Org_K and must be capable of identifying if the other parts of the data structure have been tampered with after the data structure has been signed. So, Signature_1 is the signature of {Data_ID, transaction_ID, Granting_Org_ID, Receiving_Org_ID, Statement} signed by Organisation_K.

Figure 9:
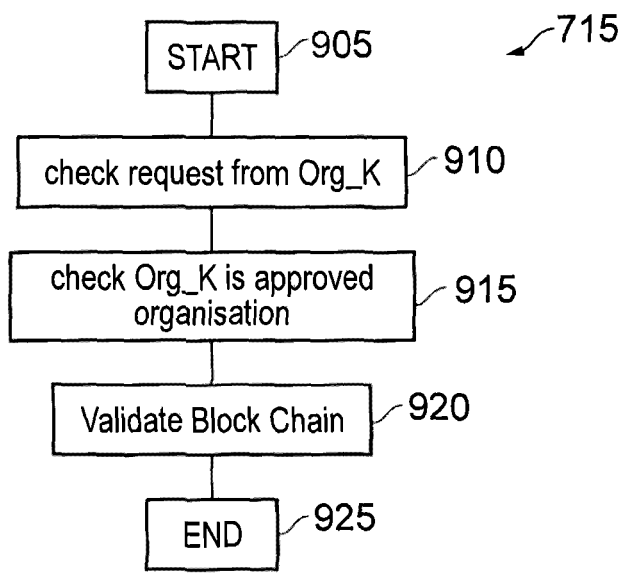
FIG. 9 shows a flow chart describing the process carried out at the server allowing inspection of the user data.

FIG. 9 shows a flow chart describing the process 715 carried out at the server 200 allowing inspection of the user data. The process 715 starts at step 905. The process moves to step 910 where the request for access to the user data is received at the server 200. In particular, the server 200 checks that the request received from Organisation_K is legitimate. In other words, the server 200 checks that the message is genuinely from Organisation_K rather than a fraudulent organisation. This is achieved using known techniques such as checking the IP address of the source message or a unique client certificate or the like.

Once it is established that the request was made by Organisation_K, the server 200 checks a real-time approved organisation database stored within the storage 220. As noted above, storage 220 may be embodied as a non-transitory storage medium. This is carried out in step 915. The approved organisation database stores the identity of organisations that have met appropriate security provisions regarding user data. For example, organisations stored in the approved organisation database may have approved processes in place to handle user data and may demonstrate certain security accreditations such as ISO27001 and the like.

If, for some reason, the organisation becomes a non-approved organisation such as by losing their ISO27001 accreditation, the organisation will be removed from the approved organisation database or will have a flag stored in association with their entry in the approved organisation database indicating that the organisation is not now approved. Indeed, in some instances, for example where the check of the message uses the unique client certificate, the client certificate may be identified as revoked when the organisation becomes a non-approved organisation.

By providing the real-time approved organisation database, organisations that no longer comply with security requirements will be no longer able to access user data.

In the event that Organisation_K is on the approved organisation list, the process moves to step 920. In step 920, the access permission in the block chain is validated. This process will be described in FIG. 10. Once the access permission has been validated, the process ends in step 925 where the data key that is associated with the requested Data_ID and any usage rules associated with the Data_ID are sent to Organisation_K.

Figure 10:
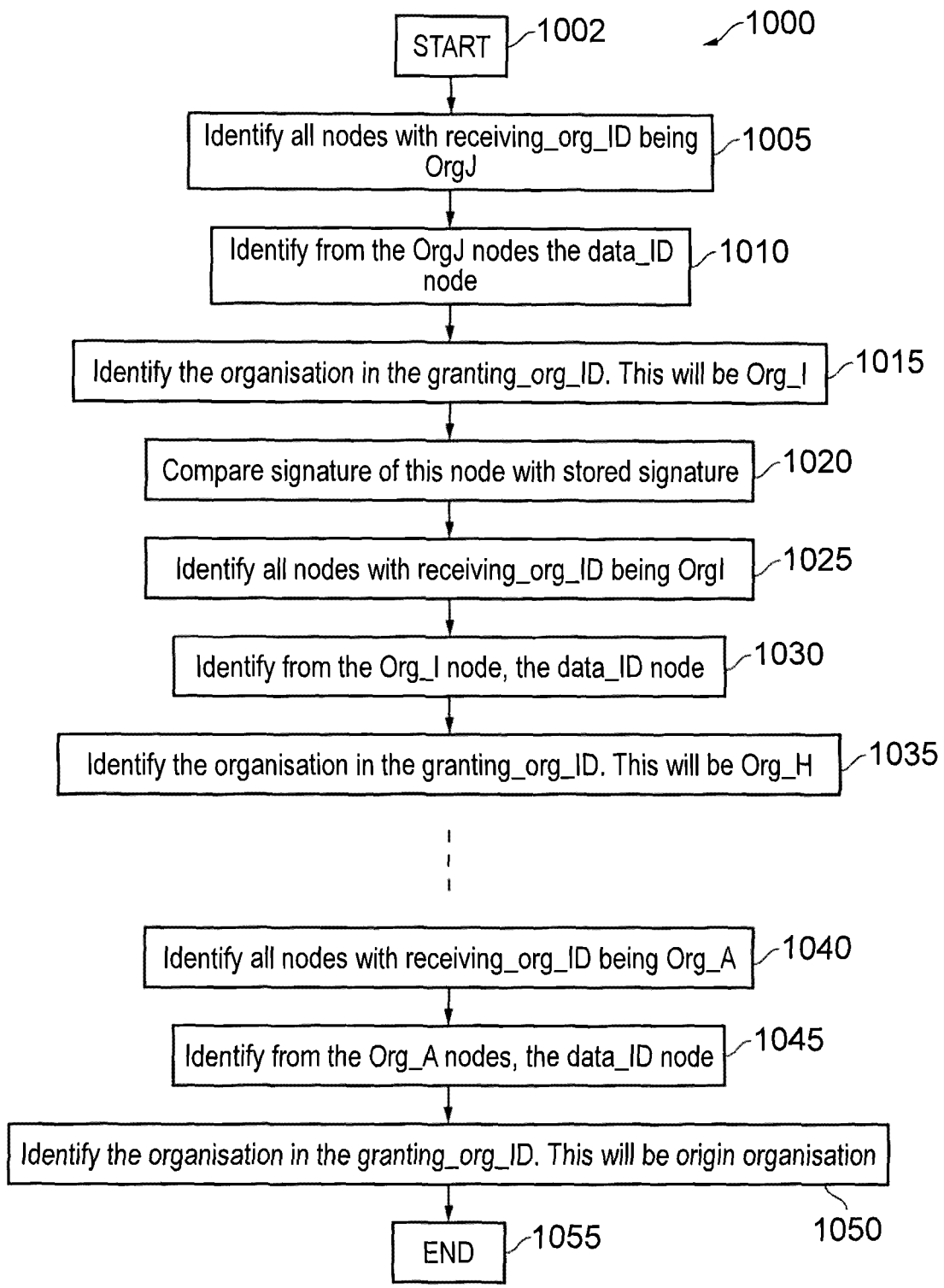
FIG. 10 shows a process describing the validation of the access permission located on the publically available database.

Referring to FIG. 10, a process 1000 is shown that describes the validation of the access permission located on the block chain. The process 1000 starts at step 1002. The process moves to step 1005 where the block chain is interrogated to identify all the nodes where the field Receiving_Org_ID has the unique identifier of Org_J. In other words, the server 200 interrogates the nodes within the block chain to identify nodes having the field Receiving_Org_ID being com.organisation_Org-J.

The process moves to step 1010 where the Data_ID of each of these identified nodes is reviewed. Specifically, the node having the Data_ID field matching that requested by Organisation_K is identified.

The process then moves to step 1015. In step 1015, the identity of the organisation in the Granting_Org_ID field is established. In this case, for the chain to be valid, the identity of the organisation in the Granting_Org_ID field should be Organisation_I. In other words, the Granting_Org_ID should be com.organisation_Org-I.

The process then moves to step 1020 where the signatures (signature 1 and signature 2) stored in the node are compared with verified signatures corresponding to the respective organisations mentioned in the Receiving_Org_ID and Granting_Org_ID fields. In other words, the signatures for each organisation stored on the node are compared with the authentic signatures of each organisation. This validates that the agreement between the two organisations stored on the node.

Now that the access permission between Organisation_I and Organisation_J has been validated, the access permission between Organisation_H and Organisation_I has to be validated.

In order to do this, the process moves to step 1025 where the block chain is interrogated to identify all the nodes where the field Receiving_Org_ID has the unique identifier of Org_I. In other words, the server 200 interrogates the nodes within the block chain to identify nodes having the field Receiving_Org_ID being com.organisation_Org-I.

The process moves to step 1030 where the Data_ID of each of these identified nodes is reviewed. Specifically, the node having the Data_ID field matching that requested by Organisation_K is identified.

The process then moves to step 1035. In step 1035, the identity of the organisation in the Granting_Org_ID field is established. In this case, for the chain to be valid, the identity of the organisation in the Granting_Org_ID field should be Organisation_H. In other words, the Granting_Org_ID should be com.organisation_Org-H.

The process then continues as above where the signatures (signature 1 and signature 2) stored in the node are compared with verified signatures corresponding to the respective organisations mentioned in the Receiving_Org_ID and Granting_Org_ID fields. In other words, the signatures for each organisation stored on the node are compared with the authentic signatures of each organisation. This validates that the agreement between the two organisations stored on the node.

The process continues validating each of the access permissions to ensure the validity of the chain of access permissions.

Assuming the chain of access permissions continues to be valid, the process reaches step 1040. In step 1040, the block chain is interrogated to identify all the nodes where the field Receiving_Org_ID has the unique identifier of Org A. In other words, the server 200 interrogates the nodes within the block chain to identify nodes having the field Receiving_Org_ID being com.organisation_Org-A.

The process moves to step 1045 where the Data_ID of each of these identified nodes is reviewed. Specifically, the node having the Data_ID field matching that requested by Organisation_K is identified.

The process then moves to step 1050. In step 1050, the identity of the organisation in the Granting_Org_ID field is established. In this case, for the chain to be valid, the identity of the organisation in the Granting_Org_ID field should be the Origin Organisation. In other words, the Granting_Org_ID should be com.organisation_Org-Origin.

Although not shown, the signatures (signature 1 and signature 2) stored in the node are compared with verified signatures corresponding to the respective organisations mentioned in the Receiving_Org_ID and Granting_Org_ID fields. In other words, the signatures for each organisation stored on the node are compared with the authentic signatures of each organisation. This validates that the agreement between the two organisations stored on the node.

After the process has validated the agreement between the origin organisation and Organisation_A, then the chain of the access permissions is validated and Organisation_K is provided the data key stored in association with the Data_ID.

FIG. 11 shows two databases stored within the server storage 220. In the first database 1100A, the Data_ID 1110A is stored in association with the corresponding data key 1120A. In other words, the database 1100A has, for each Data_ID a stored decryption key. So, when an organisation requests the decryption key for a particular Data_ID item, the server 200 can provide this. The database 1100A in embodiments is encrypted to reduce the likelihood of a third party accessing the database 1100A.

In the second database 1100B, the organisation 1110B is stored in association with a flag 1120B indicating whether the organisation is authorised to receive the data key or not. As noted above, the organisation may have the authorisation removed should the organisation fail to meet ongoing data security requirements such as maintaining an ISO27001 accreditation.

Additionally stored in association with the organisation is a signature verified to be the genuine signature associated with the organisation. This allows the signature on the access permission to be verified.

Although the above describes the unique identifier being associated with a data key that is used to encrypt the received user data, the disclosure is not so limited. For example, the data key may be generated by the device which then re-encrypts the user data. Thus, all that is required is that the user data is encrypted and that there is a unique identifier associated with the decryption key for the encrypted user data.

Obviously, numerous modifications and variations of the present disclosure are possible in light of the above teachings. It is therefore to be understood that within the scope of the appended claims, the disclosure may be practiced otherwise than as specifically described herein. In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure.

It will be appreciated that the above description for clarity has described embodiments with reference to different functional units, circuitry and/or processors. However, it will be apparent that any suitable distribution of functionality between different functional units, circuitry and/or processors may be used without detracting from the embodiments.

Described embodiments may be implemented in any suitable form including hardware, software, firmware or any combination of these. Described embodiments may optionally be implemented at least partly as computer software running on one or more data processors and/or digital signal processors. The elements and components of any embodiment may be physically, functionally and logically implemented in any suitable way. Indeed the functionality may be implemented in a single unit, in a plurality of units or as part of other functional units. As such, the disclosed embodiments may be implemented in a single unit or may be physically and functionally distributed between different units, circuitry and/or processors.

Although the present disclosure has been described in connection with some embodiments, it is not intended to be limited to the specific form set forth herein. Additionally, although a feature may appear to be described in connection with particular embodiments, one skilled in the art would recognize that various features of the described embodiments may be combined in any manner suitable to implement the technique.

Various embodiments of the present disclosure are defined by the following numbered clauses:

1. A device for authenticating an organisation requesting access to user data, comprising: network interface circuitry configured to communicate over a network, and processing circuitry configured to:
   receive, via the network interface circuitry, encrypted user data from an information processing apparatus;
   generate a unique identifier to associate with a decryption key used for decrypting the encrypted user data;
   provide the encrypted user data and the unique identifier to a publically available database for storage immutably therein or thereon;
   store the decryption key in association with the unique identifier;
   receive, via the network interface circuitry, a request to access the user data from an organisation;
   establish that the requesting organisation is an approved organisation; and in the event that the requesting organisation is an approved organisation;
   transmit, via the network interface circuitry, the decryption key to the requesting organisation.

2. A device according to clause 1, wherein the publically available database is a block-chain.

3. A device according to either clause 1 or 2, wherein the request to access the user data includes the unique identifier stored in the publically available database.

4. A device according to any one of clauses 1 to 3, wherein the processing circuitry is configured to establish that the requesting organisation is an approved organisation by: checking that the organisation is on a list of organisations.

5. A device according to clause 4, wherein the access is provided using permission from another organisation to the organisation immutably stored on the publically available database and the processing circuitry is further configured to: check the integrity of the permission.

6. A device according to clause 5, wherein the permission includes a granting organisation identifier which identifies the another organisation and a receiving organisation identifier which identifies the organisation requesting access and the unique identifier that identifies the encrypted user data.

7. A device according to any preceding clause, wherein the processing circuitry is further configured to receive, via the network interface circuitry, usage rules associated with the user data, the usage rules defining one or more criterion limiting use of the user data.

8. A requesting device for requesting access to user data, comprising: network interface circuitry configured to communicate with a device according to any preceding clause over a network, and processing circuitry configured to:
   provide a request to the device to access the user data over the network interface, the request including a unique identifier associated with the user data and an identifier associated with the organisation requesting access to the user data; and in response to providing the request;

receive, from the device, a decryption key for encrypted user data.

9. A requesting device according to clause 8, wherein in response to the provision of the request, the processing circuitry is configured to:

receive the encrypted user data from the device.

10. A requesting device according to clause 8 or 9, wherein processing circuitry is configured to decrypt the encrypted user data using the decryption key.

11. A requesting device according to clause 10 wherein the processing circuitry is configured to delete the decrypted user data.

12. A method for authenticating an organisation requesting access to user data over a network, comprising:

receiving, via the network, encrypted user data from an information processing apparatus;

generating a unique identifier to associate with a decryption key used for decrypting the encrypted user data;

providing the encrypted user data and the unique identifier to a publically available database for storage immutably therein or thereon;

storing the decryption key in association with the unique identifier;

receiving, via the network, a request to access the user data from an organisation;

establishing that the requesting organisation is an approved organisation; and in the event that the requesting organisation is an approved organisation;

transmitting, via the network, the decryption key to the requesting organisation.

13. A method according to clause 12, wherein the publically available database is a block-chain.

14. A method according to either clause 12 or 13, wherein the request to access the user data includes the unique identifier stored in the publically available database.

15. A method according to any one of clauses 11 to 14, comprising establishing that the requesting organisation is an approved organisation by checking that the organisation is on a list of organisations.

16. A method according to clause 15, wherein the access is provided using permission from another organisation to the organisation immutably stored on the publically available database and the method comprises: checking the integrity of the permission.

17. A method according to clause 16, wherein the permission includes a granting organisation identifier which identifies the another organisation and a receiving organisation identifier which identifies the organisation requesting access and the unique identifier that identifies the encrypted user data.

18. A method according to any one of clauses 11 to 17, wherein the method comprises receiving, via the network, usage rules associated with the user data, the usage rules defining one or more criterion limiting use of the user data.

19. A requesting method for requesting access to user data from a device according to any one of clauses 1 to 7 over a network, comprising:

providing a request to the device to access the user data over the network interface, the request including a unique identifier associated with the user data and an identifier associated with the organisation requesting access to the user data; and in response to providing the request; and receiving, from the device, a decryption key for encrypted user data.

20. A requesting method according to clause 19, wherein in response to the provision of the request, the method comprises:

receiving the encrypted user data from the device.

21. A requesting method according to clause 19 or 20, comprising: decrypting the encrypted user data using the decryption key.

22. A requesting method according to clause 21 comprising: deleting the decrypted user data.

23. A computer program product comprising computer readable instructions which, when loaded onto a computer, configures the computer to perform a method according to any one of clauses 12 to 22.

The invention claimed is:

1. A device for authenticating an organisation requesting access to user data, comprising:

network interface circuitry configured to communicate over a network, and processing circuitry configured to:

receive, via the network interface circuitry, encrypted user data from an information processing apparatus, the encrypted user data being generated by encrypting the user data;

generate a unique identifier to be associated with the encrypted user data and a decryption key used for decrypting the encrypted user data;

provide the encrypted user data and the unique identifier to a publicly available database for storage immutably therein or thereon, the publicly available database being configured to store the unique identifier and a chain of access permissions recording granted permissions to access the user data in a form of one or more transactions from one previously granted organisation to another;

store the decryption key in association with the unique identifier;

receive, via the network interface circuitry, a request to access the user data from a requesting organisation;

in response to the request, determine whether the requesting organisation is an approved organisation, and determine whether the chain of access permissions stored in the publicly available database is validated; and in a case that the requesting organisation is the approved organisation and the chain of access permissions stored in the publicly available database is validated:

transmit, via the network interface circuitry, the decryption key to the requesting organization; and wherein the publicly available database is a block-chain.

2. The device according to claim 1, wherein the request to access the user data includes the unique identifier stored in the publicly available database.

3. The device according to claim 1, wherein the processing circuitry is configured to determine whether the requesting organisation is the approved organisation by checking whether the requesting organisation is on a list of organisations.

4. The device according to claim 1, wherein one of the one or more transactions stored in the publicly available database records a permission granted to a receiving organisation and includes:

a granting organisation identifier which identifies another receiving organisation of another permission stored in a previous transaction immediately before the one of the one or more transactions in the chain of access permissions, a receiving organisation identifier which identifies the receiving organisation, and the unique identifier that identifies the encrypted user data.

5. The device according to claim 1, wherein the processing circuitry is further configured to receive, via the network interface circuitry, usage rules associated with the user data, the usage rules defining one or more criterion limiting use of the user data.

6. A method for authenticating an organisation requesting access to user data over a network, comprising:

receiving, via the network, encrypted user data from an information processing apparatus, the encrypted user data being generated by encrypting the user data;

generating a unique identifier to be associated with the encrypted user data and a decryption key used for decrypting the encrypted user data;

providing the encrypted user data and the unique identifier to a publicly available database for storage immutably therein or thereon, the publicly available database being configured to store the unique identifier and a chain of access permissions recording granted permissions to access the user data in a form of one or more transactions from one previously granted organisation to another;

storing the decryption key in association with the unique identifier;

receiving, via the network, a request to access the user data from a requesting organisation;

in response to the request, determining whether the requesting organisation is an approved organisation, and determining whether the chain of access permissions stored in the publicly available database is validated; and in a case that the requesting organisation is the approved organisation and the chain of access permissions stored in the publicly available database is validated:

transmitting, via the network, the decryption key to the requesting organisation; and wherein the publicly available database is a block-chain.

7. The method according to claim 6, wherein the request to access the user data includes the unique identifier stored in the publicly available database.

8. The method according to claim 6, wherein the determining whether the requesting organisation is the approved organisation comprises checking whether the requesting organisation is on a list of organisations.

9. The method according to claim 6, wherein one of the one or more transactions stored in the publicly available database records a permission granted to a receiving organisation and includes:

a granting organisation identifier which identifies another receiving organisation of another permission stored in a previous transaction immediately before the one of the one or more transactions in the chain of access permissions, a receiving organisation identifier which identifies the receiving organisation, and the unique identifier that identifies the encrypted user data.

10. The method according to claim 6, wherein the method comprises receiving, via the network, usage rules associated with the user data, the usage rules defining one or more criterion limiting use of the user data.

11. A non-transitory storage medium storing computer readable instructions which, when executed by a computer, cause the computer to perform:

receiving, via a network, encrypted user data from an information processing apparatus, the encrypted user data being generated by encrypting the user data;

generating a unique identifier to be associated with the encrypted user data and a decryption key used for decrypting the encrypted user data;

providing the encrypted user data and the unique identifier to a publicly available database for storage immutably therein or thereon, the publicly available database being configured to store the unique identifier and a chain of access permissions recording granted permissions to access the user data in a form of one or more transactions from one previously granted organisation to another;

storing the decryption key in association with the unique identifier;

receiving, via the network, a request to access the user data from a requesting organisation;

in response to the request, determining whether the requesting organisation is an approved organisation, and determining whether the chain of access permissions stored in the publicly available database is validated; and in a case that the requesting organisation is the approved organisation and the chain of access permissions stored in the publicly available database is validated:

transmitting, via the network, the decryption key to the requesting organisation; and wherein the publicly available database is a block-chain.

12. The non-transitory storage medium according to claim 11, wherein the request to access the user data includes the unique identifier stored in the publicly available database.

13. The non-transitory storage medium according to claim 11, wherein the determining whether the requesting organisation is the approved organisation comprises checking whether the requesting organisation is on a list of organisations.

14. The non-transitory storage medium according to claim 11, wherein one of the one or more transactions stored in the publicly available database records a permission granted to a receiving organisation and includes:

a granting organisation identifier which identifies another receiving organisation of another permission stored in a previous transaction immediately before the one of the one or more transactions in the chain of access permissions, a receiving organisation identifier which identifies the receiving organisation, and the unique identifier that identifies the encrypted user data.

15. The non-transitory storage medium according to claim 11, wherein the computer readable instructions, when executed by the computer, further cause the computer to perform, in the case that the requesting organisation is the approved organisation and the chain of access permissions stored in the publicly available database is validated, storing, in the publicly available database, a new transaction at an end of the chain of access permissions indicating the requesting organisation as a receiving organisation that receives a granted permission to access the user data.

16. The device according to claim 1, wherein the processing circuitry is further configured to, in the case that the requesting organisation is the approved organisation and the chain of access permissions stored in the publicly available database is validated, store, in the publicly available database, a new transaction at an end of the chain of access permissions indicating the requesting organisation as a receiving organisation that receives a granted permission to access the user data.

17. The method according to claim 6, wherein the publicly available database is a block-chain.

18. The method according to claim 6, further comprising, in the case that the requesting organisation is the approved organisation and the chain of access permissions stored in the publicly available database is validated, store, in the publicly available database, a new transaction at an end of the chain of access permissions indicating the requesting organisation as a receiving organisation that receives a granted permission to access the user data.

19. The device according to claim 1, wherein determining whether the chain of access permissions stored in the publicly available database is validated includes individually checking every transaction in the chain of access permissions.

20. A method for authenticating an organisation requesting access to user data over a network, comprising:
  receiving, via the network, encrypted user data from an information processing apparatus, the encrypted user data being generated by encrypting the user data;
  generating a unique identifier to be associated with the encrypted user data and a decryption key used for decrypting the encrypted user data;
  providing the encrypted user data and the unique identifier to a publicly available database for storage immutably therein or thereon, the publicly available database being configured to store the unique identifier and a chain of access permissions recording granted permissions to access the user data in a form of one or more transactions from one previously granted organisation to another;
  storing the decryption key in association with the unique identifier;
  receiving, via the network, a request to access the user data from a requesting organisation;
  in response to the request, determining whether the requesting organisation is an approved organisation, and determining whether the chain of access permissions stored in the publicly available database is validated; and
  in a case that the requesting organisation is the approved organisation and the chain of access permissions stored in the publicly available database is validated:
  transmitting, via the network, the decryption key to the requesting organisation; and
  wherein determining whether the chain of access permissions stored in the publicly available database is validated includes individually checking every transaction in the chain of access permissions; and
  wherein the publicly available database is a block-chain.

* * * * *